United States Patent Office 3,848,066
Patented Nov. 12, 1974

3,848,066
PROCESS FOR PREPARING CRYSTALLINE
MAGNESIUM FLUORIDE
Clarence D. Vanderpool and Martin B. MacInnis,
Towanda, Pa., assignors to GTE Sylvania Incorporated
No Drawing. Filed Nov. 15, 1973, Ser. No. 415,993
Int. Cl. C01f 5/28
U.S. Cl. 423—490    5 Claims

ABSTRACT OF THE DISCLOSURE

A process is suitable for producing a crystalline magnesium fluoride of high purity which comprises forming a reaction mixture consisting essentially of ammonium bifluoride, ammonium hydroxide and magnesium carbonate with the ammonium bifluoride and ammonium hydroxide being in stoichiometric excess in relationship to the magnesium carbonate, heating the foregoing mixture to a temperature of at least about 60° C. to evolve ammonia and carbon dioxide from the mixture and to form a crystalline solid intermediate material, separating the intermediate solid material from the liquid in the mixture drying the solids at about 100° C. and thereafter heating the crystalline material at a temperature of at least about 350° C. to convert the intermediate material to magnesium fluoride.

BACKGROUND OF THE INVENTION

Field of the Invention

This invention relates to the preparation of magnesium fluoride. More particularly, it relates to a process for preparing a crystalline magnesium fluoride suitable for preparing a crystalline magnesium fluoride suitable for special purposes such as infrared lenses and other optical devices.

Prior Art

Magnesium fluoride has been prepared by a number of different methods. For example, magnesium fluoride has been prepared by the dissolution of either magnesium oxide or magnesium carbonate in hydrofluoric acid. It has also been prepared by the reaction between magnesium sulfate or magnesium nitrate and hydrofluoric acid. The foregoing methods all have several disadvantages. Generally, any preciptiation reaction heretofore known produces a magnesium fluoride which is amorphous and is difficult to filter and dry without resorting to very expensive processes or excessive process time. Furthermore, wherein a material was precipitated, generally it is impure because other extraneous material precipitates with the desired magnesium fluoride unless very expensive and high purity reactants are used. Furthermore, the magnesium fluoride produced by precipitation is amorphous and retains large amounts of water, thus requires excessive drying times. The magnesium fluoride produced by such methods is a hard, glassy materail which must be broken up and fired. In most instances, several rewashing steps and drying steps are required to remove impurities and obtain other desired characteristics.

It is believed, therefore, a process which produces a crystalline solid complex which can be readily separated from the reactant solution and can be converted into a pure crystalline magnesium fluoride which is easily formed into a powder is an advancement in the art.

OBJECTS AND SUMMARY OF THE INVENTION

It is an object of this invention to produce a pure, crystalline mangesium fluoride.

It is an additional object of this invention to produce highly pure crystalline magnesium fluoride by a simple process.

It is a further object of this invention to provide an improved process for the production of magnesium fluoride.

These and other objects are achieved in one aspect of the invention which is a process comprising forming a reaction mixture consisting essentially of ammonium bifluoride, an aqueous solution of ammonium hydroxide and magnesium carbonate with the ammonium bifluoride and ammonium hydroxide being in stoichiometric excess in relationship to the magnesium carbonate, heating the reaction mixture at a temperature of at least about 60° C. for a time sufficient to form a crystalline intermediate material, separating the intermediate material from the aqueous phase, drying the crystalline material at about 100° C. and thereafter heating the solid crystalline material at least about 350° C. to convert the intermediate material to magnesium fluoride.

DETAILS OF THE PREFERRED EMBODIMENTS

For a better understanding of the present invention, together with other and further objects, advantages and capabilities thereof reference is made to the following disclosure and appended claims in connection with the above description of some of the aspects of the invention.

In general, ammonium hydroxide and magnesium carbonate and magnesium bifluoride are reacted together to form a magnesium-fluoride-ammonium complex. The reaction also evolves carbon dioxide and ammonia vapors during the reaction. It is believed that water and ammonium carbonate are formed and that the ammonium carbonate is broken down into ammonia and carbon dioxide, both of which evolve from the reaction media. Furthermore, the material which is not evolved is dissolved in the remaining water. The ammonium-fluorine-magnesium complex is crystalline and is believed to be analogous to a chlorine compound which contained both magnesium and ammonia. The chlorine compound is soluble in water and is commonly used for the precipitation of phosphorus in analytical chemistry. The material upon heating evolves ammonia and any unreacted raw materials that may be entrapped in the complex. The excess ammonium hydroxide remains in the aqueous phase, thus, it is believed to be apparent that a highly pure material is produced because all reaction products are either water, water soluble or volatile upon heating above 350° C.

Although it is not known for certain the exact reaction which occurs during the formation of the ammonium-fluorine-magnesium carbonate, it is believed that the complex formed is $NH_4F \cdot MgF_2 \cdot 6H_2O$ according to the reaction:

$$3NH_4F \cdot HF + 10NH_4OH + 2MgCO_3 \rightarrow$$
$$2(MgF_2 \cdot NH_4F \cdot 6H_2O) + 11NH_3\uparrow 2CO_2\uparrow$$

Based upon the assumption that the foregoing complexes formed, theoretically 3 moles of ammonium bifluoride are required per 2 moles of magnesium carbonate; since a stoichiometric excess of ammonium bifluoride is used, the molar ratio $NH_4HF_2$ to magnesium carbonate is greater than 3:2. Theoretically 10 moles of ammonium hydroxide are required per 2 moles of magnesium carbonate to produce the forementioned complex. Since a stoichiometric excess of ammonium hydroxide is used, the molar ratio of ammonium hydroxide to magnesium carbonate is greater than 10:2.

In the initial reaction, the temperature is generally raised from above 20° C. (room temperature) until there is some evidence of evolution of ammonia and carbon dioxide and is thereafter increased to at least about 60° C. wherein the white magnesium carbonate is transformed into a more transparent ammonium-fluorine-magnesium complex. The reaction media can be heated to above about 100° C., however, for practical equipment reasons lower temperatures are generally used. Temperatures from about 60° C. to about 75° C. are preferred. The resulting material settles quite rapidly and filters very fast. After separation by conventional means, the complex is fired at at least about 350° C., although higher temperatures are quite often used. Since magnesium fluoride undergoes a change at 700° C. which is not completely understood and thereafter resists hot pressing, generally temperatures above 700° C. are not employed except where it is certain that the magnesium fluoride will not be subsequently hot pressed. Temperatures generally from 450° C. to about 650° C. are preferred. In the firing step, if desired, an excess of ammonium bifluoride can be added to aid in the conversion to pure magnesium fluoride. Generally, less than a 5% excess of ammonium bifluoride is utilized. While the excess is not always required as evidenced by Example III hereinafter, the presence of ammonium bifluoride assures that certain reactive groups which are detrimental to infrared transmission, such as the hydroxyl groups, are minimized. As can be seen, the process is a relatively simple one and is more clearly pointed out in the detailed examples which follow. All parts, proportions and percentages are by weight unless otherwise indicated.

EXAMPLE I

About 28.5 parts of ammonium bifluoride $NH_4F \cdot HF$ is dissolved in about 449 parts of reagent grade (28% by weight) ammonium hydroxide. About 42.2 parts of magnesium carbonate is added to the above solution. The solution becomes slightly warm. The mixture is heated slowly with agitation (to keep the magnesium carbonate suspended). Between about 30–40° C. there is some evolution of $NH_3$ and $CO_2$. Heating is continued slowly until at approximately 60° C. the white magnesium carbonate is transformed into a more transparent ammonium magnesium fluoride complex.

The complex settles rapidly and filters very fast. After filtering, it is dried at about 110° C.

The white fluffy powder is mixed with about 3.5% $NH_4F \cdot HF$ and fired at about 620° F. for four hours in a laboratory electric furnace.

The material is identified as pure $MgF_2$.

EXAMPLE II

About 570.0 parts of reagent grade ammonium bifluoride are dissolved in about 3700 parts of reagent (28%) ammonium hydroxide. The ammonium bifluoride dissolves with boiling. Then about 420 parts of magnesium carbonate is added. The solution of materials is heated at about 40° C. and starts to foam. The heat is continued up to about 60° C. when most of the foaming stops. After settling the material is filtered.

After drying at about 150° C. overnight to remove water, the white powder is mixed with about 3.5% ammonium bifluoride and fired for four and one-half hours at 620° C.

X-ray identifies the white soft powder as pure magnesium fluoride. Chemical analysis shows 38.9% Mg and 58.2% fluoride with 0.01% moisture. Theoretical for $MgF_2$ is 39.02 Mg, 60.98% F.

EXAMPLE III

About 75 parts of 28% ammonium hydroxide is placed in a plastic lined tank. Then slowly, with agitation, about 13 parts of ammonium bifluoride is added which dissolves with boiling. After the boiling stopped about 8 parts of magnesium carbonate is added with agitation.

While still agitating, the solution is heated slowly. At approximately 40° C. the mixture foams. Heating is continued to 60° C. and results in the magnesium carbonate taking on a glass type appearance. After filtration without washing, the filter cake is dried at about 110–115° C. in an electric oven. The powder (complex) is soft and white. One part of the material is fired as is, another part is fired with about 3.5% $NH_4F \cdot HF$. Both are fired at about 600° C.

Both are identified as pure $MgF_2$ by X-ray. The sample fired with ammonium bifluoride contains 38.9% Mg and 59.2% F. The sample fired without excess ammonium bifluoride contains 38.8% Mg, 59.9% F. Theoretical for $MgF_2$ is 39.02% Mg and 60.98% F.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process suitable for producing crystalline magnesium fluoride comprising:
    (a) forming a reaction mixture consisting essentially of ammonium bifluoride, an aqueous solution of ammonium hydroxide and magnesium carbonate, said ammonium bifluoride and ammonium hydroxide being in stoichiometric excess of said magnesium carbonate;
    (b) heating the foregoing mixture at a temperature of at least about 60° C. for a time sufficient to form an intermediate solid complex;
    (c) separating said complex from the aqueous phase;
    (d) drying said complex at a temperature of at least about 100° C. and
    (e) heating the dried complex to at least about 350° C. to form magnesium fluoride.

2. A process according to Claim 1 wherein the molar ratio of ammonium bifluoride to magnesium carbonate is greater than about 3:2.

3. A process according to Claim 2 wherein the molar ratio of ammonium hydroxide to magnesium carbonate is greater than about 10:2.

4. A process according to Claim 3 wherein said reaction mixture is heated at a temperature of from about 60° C. to about 75° C.

5. A process according to Claim 3 wherein said dried complex is heated at a temperature of from about 450° C. to 650° C.

References Cited

UNITED STATES PATENTS

| | | | |
|---|---|---|---|
| 3,357,788 | 12/1967 | Ross | 423—490 |
| 3,366,444 | 1/1968 | Laferty, Jr. et al. | 423—490 |

FOREIGN PATENTS

| | | | |
|---|---|---|---|
| 194,789 | 1967 | Russia | 423—480 |

EDWARD STERN, Primary Examiner

U.S. Cl. X.R.

423—356, 438, 464, 497